(12) United States Patent
Toofan et al.

(10) Patent No.: US 10,778,655 B2
(45) Date of Patent: Sep. 15, 2020

(54) SECURE CONTROL AND ACCESS OF A VEHICLE (71) Applicants: Mehrdad Toofan, Milpitas, CA (US); Mehzad Toofan, Milpitas, CA (US)

(72) Inventors: Mehrdad Toofan, Milpitas, CA (US); Mehzad Toofan, Milpitas, CA (US)

(73) Assignee: Solexir Technlogy

( * ) Notice: Subject to any disclaimer, the term of this patent is extended or adjusted under 35 U.S.C. 154(b) by 163 days.

(21) Appl. No.: 16/051,035

(22) Filed: Jul. 31, 2018

(65) Prior Publication Data
US 2020/0045025 A1    Feb. 6, 2020

(51) Int. Cl.
*H04L 29/06* (2006.01)
*H04L 9/06* (2006.01)

(52) U.S. Cl.
CPC ........ *H04L 63/0435* (2013.01); *H04L 9/0656* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 6,617,961 B1* | 9/2003 | Janssen | B60R 25/245 307/10.1 |
| 7,092,943 B2* | 8/2006 | Roese | G01S 5/02 |
| 9,130,930 B2* | 9/2015 | Kennedy | B60R 25/257 |
| 2002/0133716 A1* | 9/2002 | Harif | G07C 9/27 726/9 |

* cited by examiner

*Primary Examiner* — Kaveh Abrishamkar (57) ABSTRACT

A method is disclosed to secure the operation of a vehicle. To detect any tampering during the communication of information or command, encrypting and authenticating devices are placed on the two ends of a communication channel. On the first end, an encryption device generates a first packet by encrypting the information using a random variable. The first packet and the information are communicated to the second end of the communication channel. On the second end, the authenticating device generates its own packet by encrypting the information using the random variable; then it compares the two packets and pronounces the information authentic if the two packets are identical. Any tampering with the information or the first packet will be detected and blocked by the authenticating device. Secured sensor and secure actuator are also provided.

15 Claims, 8 Drawing Sheets

SECURE CONTROL AND ACCESS OF A VEHICLE

RELATED APPLICATIONS

This application claims the benefit, under 35 U.S.C. § 119, of U.S. to Provisional Application Ser. No. 62/453,318, filed on Aug. 9, 2017, titled "USING INTEGRATED CIRCUITS TO AUTHENTICATE AND TO SECURELY ACCESS AND TO CONTROL," and is incorporated herein by reference.

The subject matter of this application is related to subject matter disclosed in U.S. patent application Ser. No. 12/697,224, now U.S. Pat. No. 8,789,746.

BACKGROUND OF THE DISCLOSURE

Recent advances in vehicle technology, from self-driving cars to autonomous drones and similar vehicles, the security and safety for these vehicles have taken the center stage. These vehicles are operated under tight control of Electronic Control Units (ECUs) which uses sensors and activators to monitor and to control numerous operations taking place as part of the vehicle's smooth operation. Such ECUs normally are driven by multi-millions lines of code designed to derive actuators that help carry out a wide range of tasks such as unlocking the vehicle door, adjusting throttle valve opening, applying breaks, steering self-driving vehicles, communicating with external networks, etc. Interconnecting all ECUs, all the sensors, and all the actuators, requires an insane number of wires rendering direct interconnection unrealistic.

To reduce the amount of wiring the vehicles designers rely on using various communication buses such as Controller Area Network (CAN) bus. However, CAN bus lacks most provisions needed to address the newly found security issues which were unknown to the standard body who originally defined the bus. In addition, the digital information exchanged between various ECUs and between the vehicles' gateways with outside-world, could be prone to hacking attacks and malicious interventions. As an example, research has demonstrated how one could inject false traffic information into the vehicle navigation system utilizing Radio Data System, and Traffic Message Channel.

Should an attacker or a hacker access and control the ECU assigned to critical operation of the vehicle, it can create havoc and compromise the safety of the hacked vehicle, other vehicles, and their occupants. As such vehicle manufactures employ a variety of techniques to deter hacking into the vehicle. As an example, one modern anti-theft system, which is popular among vehicle manufactures, is to use a cryptographic protocol such as challenge-response onboard the vehicle. The vehicle first generates a pseudorandom number (challenge) which requires to be authenticated by the remote unit. The remote unit in response calculates the next code in the sequence and sends it back (response) to be checked by the vehicle for correctness. The scheme relies on the fact that the procedure for generating the pseudorandom number is secret and each invocation would bring about an unpredictable number. However, it was shown how a side channel attack could successfully sniff out the master key for the random number generator thus allowing an attacker to access every vehicle that uses this algorithm.

Other hacker have been able to demonstrate how easy it is to circumvent the CAN bus by injecting malicious code into the bus system, either through the diagnostic channel, or through the entertainment system to falsely force an ECU to take dangerous decisions (such as applying a sharp turn when the vehicle is moving, or exceedingly speeding or unnecessarily breaking). The CAN bus has been widely used across the industry but has the major drawback that it has no protocol to provide a measure of authenticity. Not only the CAN bus messages lack the feature of identifying a sender or a receiver of a message, if receiving node is not configured to receive a particular type of message, it will ignore all these types of messages. In fact, some researchers have demonstrated that they could remotely get some malicious code to be executed on a vehicle using either mp3 radio parser, Bluetooth, or via telematic units. Once the research team was able to make the code running on the vehicle, the researchers could then inject CAN messages which adversely affected the performance of the vehicle.

U.S. Pat. No. 7,734,046 issued to Volker Urban et al., describes an authentication method between a vehicle transponder device and a reader device containing a microprocessor wherein the transponder controls certain functions of the vehicle. The process of authentication starts with the microprocessor sending a random number RN1, along with an encryption of the random number F(RN1) to the transponder. The transponder generates its own encrypted version of the random number which is compared to the one sent by the microprocessor to decide whether or not to send an ACK or NACK signal back to the processor for confirming or denying the initial transaction between the two devices. The transponder also creates a new encryption of the random number G(RN1) which is sent back to the microprocessor. The microprocessor device then decrypts the new function G(RN1) to check the validity of the encryption by the transducer.

The problem with the above disclosure is that the encryption keys used are stored onboard memory devices for both the microprocessor and the transponder and thus can be detected easily by someone skilled in the art. Furthermore, both the encryption and decryption algorithm used in the reader device are software-based running on the microprocessor device for which the corresponding code not only is susceptible to hacking, it is also rather slow. Finally, the amount of information that are transmitted back and forth between the transponder and the microprocessor is not practical.

U.S. Pat. No. 7,231,041 issued to Thomas M. Forest et al., describes how a key fob device could be used to instruct a receiver device to lock or unlock a door to a vehicle. A secrete key shared between the two devices, along with a "key generator" circuit, is used to encrypt a nonvolatile counter by the key fob device to generate a "working key" which is then transmitted to the receiver device during a "training session" for all future communications. When the key fob sends an encrypted command using the "working key" to the receiver device, the latter decrypts the command using the same "working key" and compares it against expected values before trying to implement the command. The "working key" will be different in each invocation, due to a counter from a non-volatile device.

The problem with the above disclosure is that the nonvolatile counter is not an integral part of encryption engine. As such, one could put the key fob device in training mode while replacing the nonvolatile counter with a fake one causing the same "working key" to be sent to the receiver device. Furthermore, it is not clear how the unique generating key that is programmed into a key fob at the factory related to a particular vehicle and how the "receiver" would associate that particular key fob with the vehicle. This important missing information allows any key fob to open or to close the door of any vehicle using the above disclosure.

U.S. Pat. No. 7,034,654 issued to Thomas M. Forest et al., describes a challenge/response scenario between an Engine Immobilizer Unit (EIU) and a vehicle Electronic Control Unit (ECU) as an engine immobilizer security system. Both ECU and EIU use the same secrete encryption key for communication between the two units. The ECU sends a randomized challenge to the EIU, which would be encrypted as a response and be sent back to the ECU. The ECU uses the same key and encryption circuit to encrypt the challenge and compares the encrypted challenge to the response. If the response matches the encrypted challenge, engine operation is enabled.

The problem with the above disclosure once again lies with the fact that the EIU has no particular association with a given ECU. As such, any EIU which shares the same encryption key as the ECU, would be able to respond correctly to a challenge from the ECU and thus igniting the engine. Also, if ECU uses software to preform encryption, that would be prone to hacking.

U.S. Pat. No. 5,600,723 issued to Phillip J. Woodall et al., uses a fuel pump unit to authenticate an inserted ignition key into the vehicle lock to allow operation of the vehicle. Both vehicle serial number and the ignition key serial number are stored on memories in the fuel pump unit as well as on the ignition key. An encryption scheme on the fuel pump unit is used to encrypt the vehicle serial number which is sent to the ignition key. The ignition key decrypts the received information using the same vehicle serial number to recover the random number. The encryption engine on the ignition key then encrypts the key serial number on the ignition key using the random number and sends that back to fuel pump unit. The fuel pump unit decrypts the encrypted information and recovers the key serial number which is then compared with the key serial number stored in the memory of fuel pump to authorize the engine ignition.

The problem with the above disclosure is that at least two encryption and two decryption operations are required, each with a different serial number to make the scheme work and thus it would be slow and not cost effective. More importantly both vehicle serial number and ignition key serial number are stored on distinct memory modules onboard the ignition key. The distinct memories are relatively easy to hack and access their content; an intruder can easily read the memories onboard the ignition key and make a legitimate key from a blank ignition key and steal the vehicle.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

The disclosed invention is concerned with a method to secure the operation of a vehicle. To secure the communication between a sensor and an ECU, in one embodiment an encrypting device having an encryption engine and a compiled key is provided in the vehicle in close proximity to the sensor which generates some data. The device is directly wired to the sensor and their connection is secure. A second, authenticating device having the same encryption engine and complied key but also having a comparator is connected to the ECU at a different location in the vehicle. To ensure the flow of information from the sensor to the ECU is secure, the device close to the sensor generates an encrypted packet by encrypting the data, scrambled with a random variable, and sends the packet and the original data to the second device connected to the ECU. The second device produces its own encrypted packet by encrypting the data scrambled with the same random variable. The second device then compares the two encrypted packets and deemed the data authentic if the two packets are identical. If the data is authentic the ECU can proceed to the next step. If the data has been tampered while it was communicated between the sensor and ECU, the resulting packets will not be the same and the data may not be used, thereby protecting the vehicle from being misled.

A remote unit referenced in the current disclosure applies to an apparatus which wirelessly communicates with the vehicle. An example of a remote unit is an automobile key fob, a remote control unit, a handheld device, a cellular phone, etc.

In other embodiments, similar method is used to secure communication between ECU-ECU, ECU-sensor, ECU-actuator, and 'remote unit'-critical modules.

In some embodiments a method is provided to securely operating a vehicle when the remote unit is not accessible by being too far apart from the vehicle. In this case a pair of transceiver is provided to extend the range of communication between the encrypting and authenticating devices.

Additional aspects, embodiments, and advantages of the disclosed methods may be understood with reference to the following detailed description taken in conjunction with the provided drawings.

DETAILED DESCRIPTION OF DISCLOSURE

Embodiments of the current invention provide methods of securely operating or accessing a vehicle. The invention provides methods of detecting any intrusion and tampering of the communication channels between components in a vehicle to ensure the components are performing their functions based on authentic command and data which would lead to secure operation of a vehicle. The invention also provides a method of remote communication with the vehicle using transceiver devices.

The current invention makes use of two integrated circuit devices (electronic chips) whose structure and features are detailed in the U.S. Pat. No. 8,789,746. The first device, Smart Tag, closely resembles the second device, Reader, in that both devices incorporate identical symmetric encryption engines. For both devices, the compiled encryption key is hidden and is never broadcasted outside the two chips. Below, we first describe the functions of these two devices.

Figure 1:
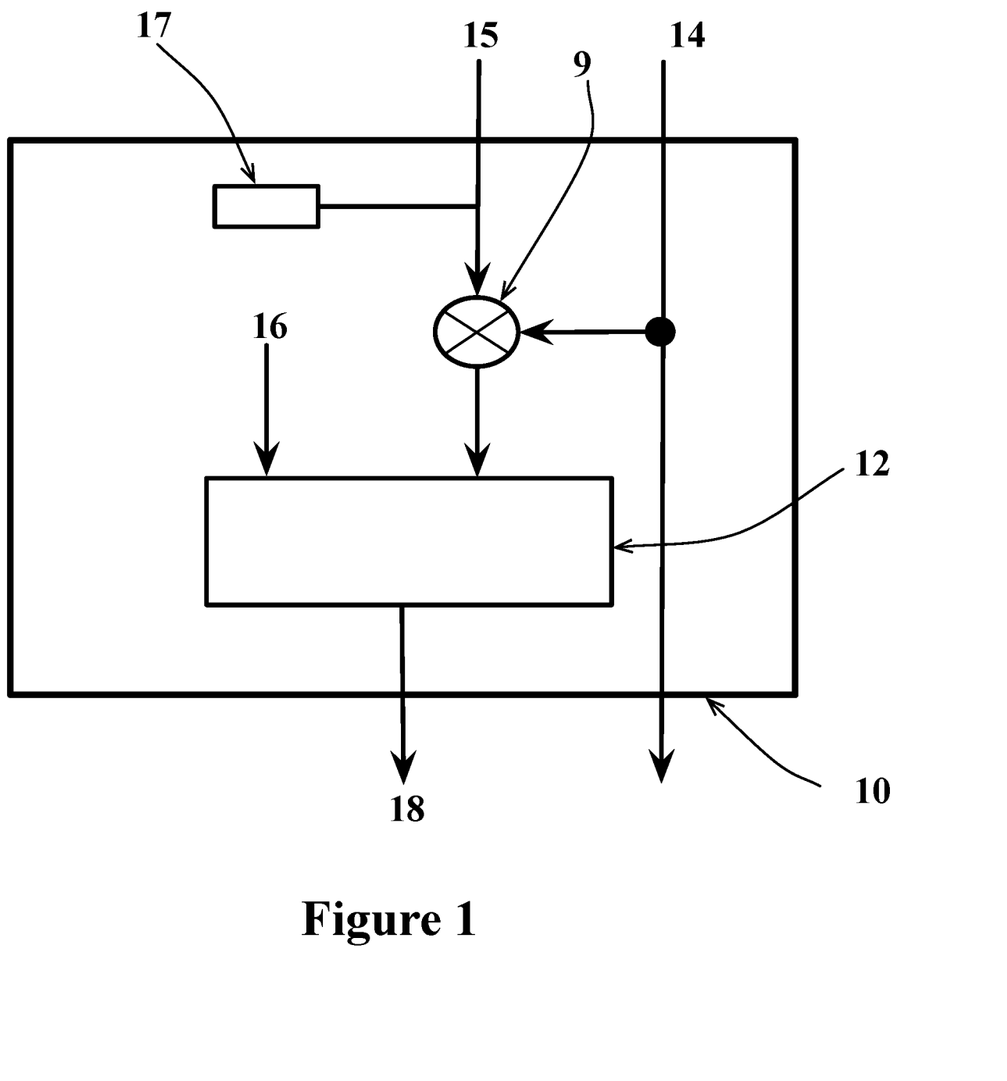
FIG. 1 shows a schematic diagram of an encrypting device, the Smart Tag.

FIG. 1 shows a schematic representation of the Smart Tag device 10, an integrated circuit (chip) device. This device is equipped with an encryption engine 12 which is capable of receiving and encrypting the input information 14 (also referred to as data throughout this disclosure) into an encrypted output 18 which has no similarity to the original input information 14 and is unrecognizable from it.

The encryption engine 12 uses a key 16 to perform the encryption. In the prior art, the encryption key is normally part of a structured component of the chip, such as onboard memory. In contrast, in order to decrease the possibility of reverse engineering the device and extracting the encryption key from a particular structure onboard the chip, the encryption key is part of the chip logic during the chip synthesize and logic optimization. Consequently, the compiled encryption key is an integral part of compiled logic and is indistinguishable from the surrounding sea-of-gates logic on the chip, and the task of reverse engineering and extracting the compiled encryption key is almost impossible. This security feature would not allow hackers to crack the encryption scheme, even if they become aware of the encryption algorithm used on the Smart Tag.

The encryption can be made even stronger by introducing a random variable 15. The random variable is used to scramble the input information (data) to the encryption engine in a predicted way and as such with a given, fixed input information, the output of encryption engine would be different on every invocation. This scheme deters any attempt to decipher or to crack the encryption algorithm and method even further. Depending on the application, the random variable may be generated by a dedicated circuitry 17 onboard the device or it may be received externally.

The scrambling of the input information by the random variable must be a reversible operation in the sense that if one applies the scrambling operation to an already scrambled information, the original input information is reproduced. An example of a scrambling operation is an XOR operation, or a binary rotation of data. To demonstrate this, note that if the input information is XORed with RND followed by XORing the result with the RND once again, it will reproduce the original input information, wherein RND here represents a random variable.

Figure 2:
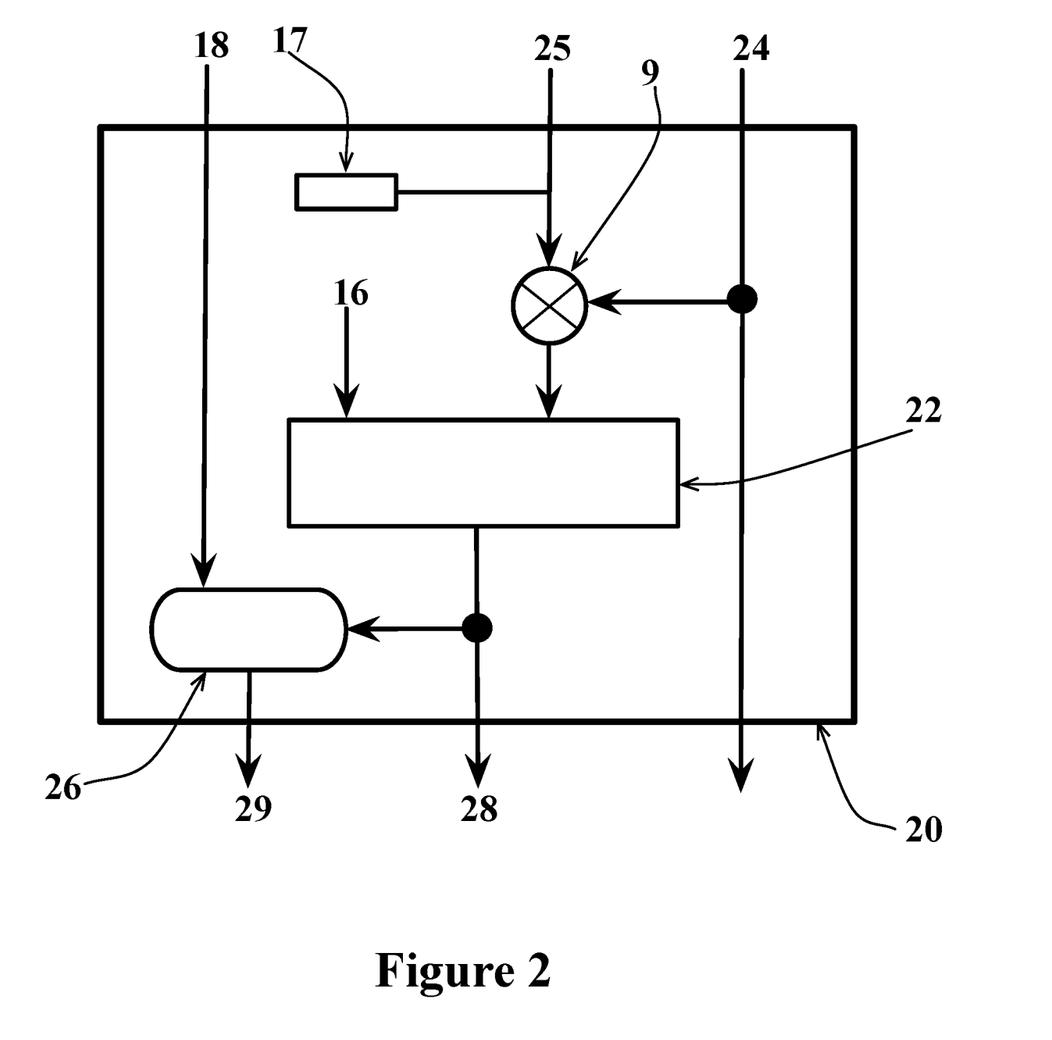
FIG. 2 shows a schematic diagram of an authenticating device, the Reader.

FIG. 2 shows an exemplary implementation of the Reader device 20, an integrated circuit (chip) device in accordance with the current invention. The Reader device shares the same circuitry as described in FIG. 1, but in addition has a comparator 26 which can compare the encrypted information 28 from its own encryption engine 22 with the encrypted information 18 it receives from another device. The Reader device is designed to have the same compiled encryption key 16, the same encryption engine, and the same dedicated random variable generator 17 as in FIG. 1.

The compiled encryption key, as stated in the preceding paragraph is part of the chip logic during the chip synthesize and logic optimization and therefore is an integral part of compiled logic. Consequently, the compiled encryption key is indistinguishable from the surrounding sea-of-gates logic on the chip. Given the same input information (data) 14 to the encryption engine, the same random variable 15, and the same compiled encryption key 16, the encrypted information 18 from the Smart Tag 10 and the encrypted information 28 from the Reader device 20 will be identical and the comparator tags the input information 24 (or 14) as "authentic data" in its output 29.

The authentication operation described above entails the Reader to encrypt and compare the encrypted packets. Alternately, the Reader can decrypt the encrypted packet 18 and compare with the original input information 24 (or 14) to generate the output 29.

Note that an intruder may try to tamper the data between the two devices as the data leaves from one device and travels to the next one, however:

1. If the input 14 (shown in FIG. 1) is tampered with, the input 24 and 14 will differ, leading to encrypted information 28 being different from 18
2. If the random number 25 is tampered with, the input 24 (shown in FIG. 2) and 14 (shown in FIG. 1) will be different leading to encrypted information 28 different from 18
3. If the encrypted information 18 is tampered with, 18 and 28 will be different The comparator will easily detect a discrepancy between 18 and 28 and flags an intrusion or lack of authenticity in its output 29. In such instances, the information 24 as entered the Reader device will be deemed as "non-authentic data".

The devices 10 and 20 are positioned at the two ends of an information communication path and the device in the receiving end performs the authentication. The strong encryption/decryption and lack of access to the compiled encryption key 16 ensures any tampering in the communication path will be detected and blocked out. The Reader device 20 is equipped with a comparator 26 and is suitable to perform the authentication while the Smart Tag device 10 is designed for encryption/decryption purposes only. As a result this arrangement of the devices is suitable for one way communication. However, if two-way communication is desired, both ends of communication path can be equipped with Reader devices in which case each Reader 20 performs the authentication only if it is in the receiving end. The encryption engines 12 and 22, in FIG. 1 and FIG. 2 respectively, have the ability to both to encrypt as well as to decrypt their input data.

In some embodiments, the current invention is used to secure the communication between a sensor and an ECU. Modern vehicles rely on many sensors that provide measurements that are used by ECU to ensure secure operation of the vehicle. Examples of commonly used critical sensors are Engine Control Module, Electronic Brake Control Module, Transmission Control Module, Body Control Module, Telematics Module, Remote Control Door Lock, Inflatable Restraint Sensing and Diagnostic Module, Instrument Panel Cluster/Driver Information Center, Radio, and Theft Deterrent Module. These sensors are distributed at different locations in a vehicle and are not necessarily in close proximity of an ECU. As such, the data from these sensors need to be communicated to the ECU which is done wirelessly or using a physical bus which typically is Controller Area Network (CAN) bus. It is well known that the communication channels are insecure and can be readily attacked.

The communication channel can be secured by encrypting the data which is sent through the communication channel, and decrypting the data at the receiving end. However, this approach alone is not enough to ensure the authenticity of the data since a faulty encrypted data could be injected into the communication channel and the receiving side has no way of knowing if such attack has taken place.

Figure 3A:
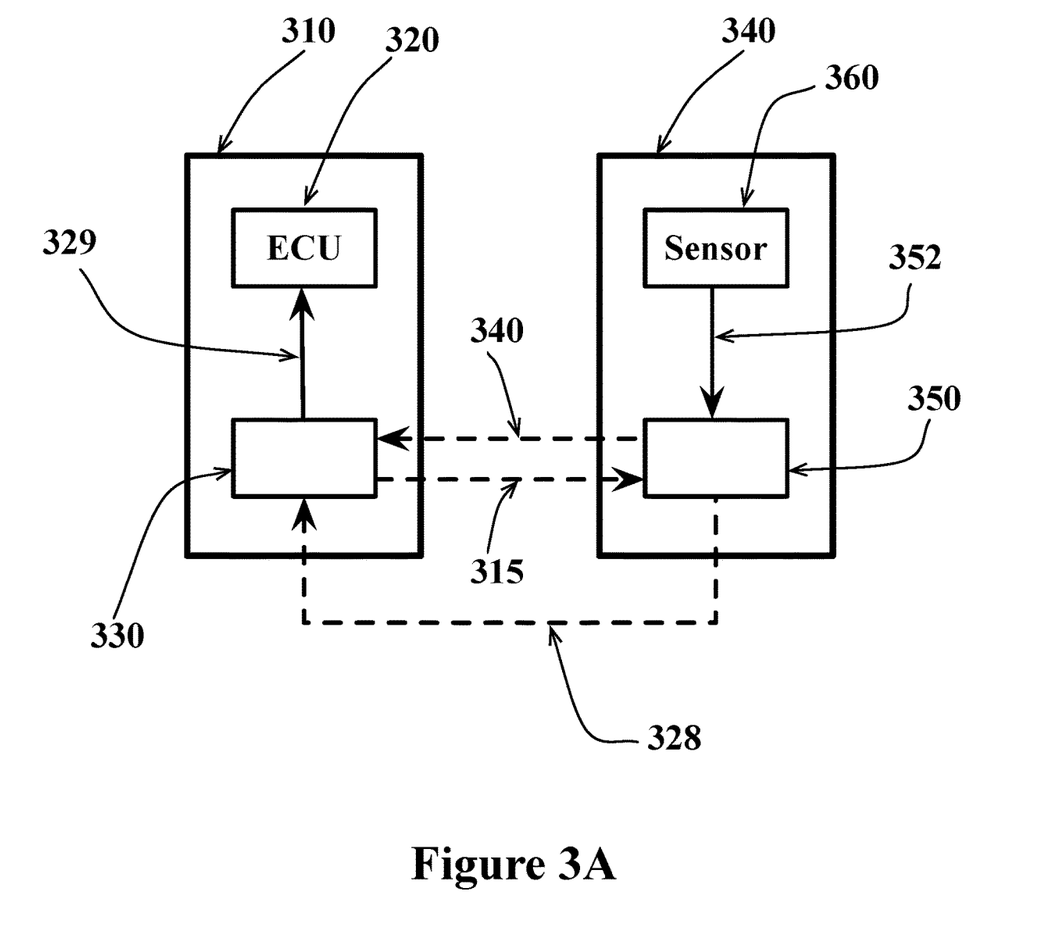
FIG. 3A shows a schematic diagram of an embodiment wherein the data from a sensor is authenticated. A sensor is equipped with an encrypting device, which is used to prepare and to send an encrypted packet to an ECU which uses its authenticating device to prepare a second encrypted packet and to compare with the first packet to decide the authenticity of the sensor data.

In some embodiments of the invention, shown in FIG. 3A, the devices of FIG. 1 or 2 are used to perform both the encryption and authentication of the data. In FIG. 3A, the set 340 includes the sensor 360 and a device 350 which are in close proximity, directly wired together, so that the communication between them does not rely on a bus and is secure. Likewise the set 310 includes the ECU 320 and a device 330, which are in close proximity, directly wired together so that communication between them is secure. The device 350 is of type 10 or 20 depending on the communication being one or two directional while the device 330 is always of type 20 since it is required to perform authentication operation. The set 310 and 340 are remotely located from each other and any communication between them can be subject to attack. In FIG. 3A, the weak link (vulnerable) part of the communication is shown by dash line and lies between the two sets 310 and 340. The set 340 is an example of a secure transducer of sensor type since it is capable of generating an encrypted packet of the sensor data which can be used to detect any tampering or intrusion happens to the sensor data while it is communicated to an ECU. Having this feature enables the set 310 to decide whether it wants to use or not use the data based on the results of its onboard authentication device 330.

Operationally, the sensor 360 performs a measurement and provides the data 352 to the device 350. A random variable 315 is generated by either device 350 or device 330, preferably by the device 330 in the receiving end of communication, and is communicated between the two devices. The device 350 uses the random variable to scramble the sensor data 352 followed by encryption of the sensor data to generate an encrypted version 328 of the sensor data. Both the scrambled sensor data 340 and encrypted version of it 328 are communicated to the device 330 which perform the authentication and provides the ECU 320 with the results of authentication 329. If the data is deemed authentic by the device 330, the ECU 320 moves to perform the required operation which is programmed to do. In this scheme, the ECU takes the appropriate action on the sensor data only if the sensor data has not been tampered with.

Critical components in a vehicle are those elements which are extremely important for the correct operation of the vehicle or the safety of its occupants (such as Engine Control Module, Electronic Brake Control Module, Transmission Control Module, Body Control Module, Telematics Module, Remote Control Door Lock, Inflatable Restraint Sensing and Diagnostic Module, Instrument Panel Cluster/Driver Information Center, Radio, and Theft Deterrent Module, etc.). An ECU which is assigned to a critical component could interrogate a critical component to ensure it is a genuine part. To do so, the critical component will be equipped with a Smart Tag, or a Reader device which is programmed with a unique identification number (data) assigned by the trusted manufacturer. The ECU assigned to this critical component is also equipped with a Reader device (second Reader device) which can be used to authenticate the component by preforming the authentication operation of the unique identification number of the critical component.

In some embodiments, the current invention can be used to communicate between different ECUs. Modern cars have many (in excess of 50) ECUs and some functions requires communication between them. If these ECUs are not adjacent to each other, direct wiring between them is not practical and a dedicated communication channel is required which is vulnerable to attack by intruders. These embodiments use the structure similar to FIG. 3A, except the sensor 360 in FIG. 3A is replaced by a second ECU which serves to authenticate the data and ensure the ECUs are acting only on authentic data.

Figure 3B:
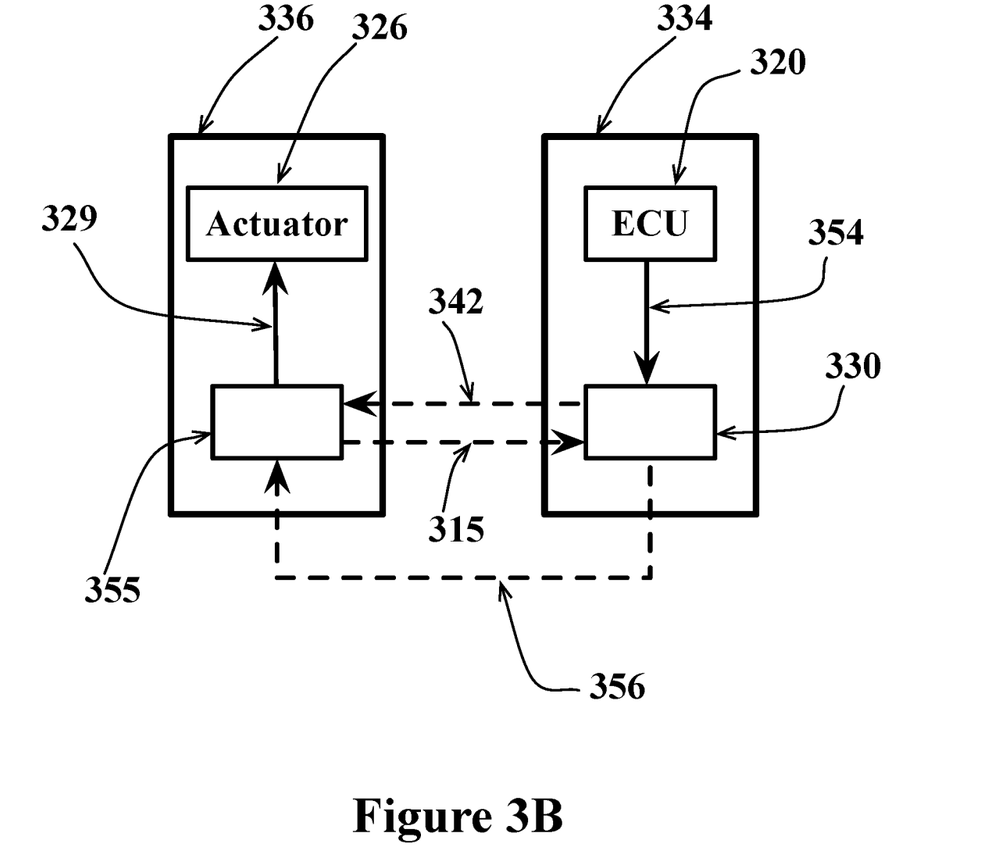
FIG. 3B shows a schematic diagram of an embodiment wherein the instruction from an ECU to an actuator is authenticated. An ECU is equipped with an encrypting device, which is used to prepare and to send an encrypted packet to an actuator which uses its authenticating device to prepare a second encrypted packet and to compare with the first packet to decide the authenticity of the instruction data received from the ECU.

In some embodiments, the current invention can be used to securely communicate between an ECU and an actuator. Traditionally, vehicles have many actuators. Each actuator performs a particular function and in recent years more and more actuators have been modified to be controlled by an ECU. Notable example is the throttle cable which has been eliminated and the throttle is digitally controlled by an ECU. If an actuators and the ECU are not adjacent to each other, a communication channel (other than direct wire connection) is required which is vulnerable to attack by intruders. FIG. 3B shows an extended actuator 336, and a set 334 containing the ECU 320 and an encrypting device 330. The extended actuator contains the actuator 326 and an authentication device 355. In FIG. 3B, the set 336 includes the actuator 326 and a device 355 which are in close proximity, directly wired together, so that the communication between them is not wireless and does not rely on a bus and is secure. Likewise the set 334 includes the ECU 320 and a device 330, which are in close proximity, directly wired together so that communication between them is secure. The device 330 is of type 10 or 20 depending on the communication being one or two directional while the device 355 is always of type 20 since it is always required to perform authentication operation. The combination 336 is an example of a secured transducer of actuator type since it is capable of detecting any tampering or intrusion it receives. Such transducer is capable to perform or not perform an instruction based on the results of its onboard authentication device 355.

Operationally, referring to FIG. 3B, the ECU 320 instructs the actuator 326 to perform its assigned function. A random variable 315 is generated by either device 355 or device 330, preferably by the device 355 in the receiving end of communication and is communicated between the two devices. The device 330 uses the random variable to scramble the instruction (data) 354 followed by encryption of the scrambled instruction data to generate an encrypted version 356 of the instruction data. Both the scrambled instruction data 342 and its encrypted version 356 are communicated to the device 355 which performs the authentication operation and provides the actuator 326 with the results of authentication 329. If the instruction data is deemed authentic by the device 355, the actuator is provided with the authentic ECU instruction 354 so the actuator could carry out the needed function.

Figure 3C:
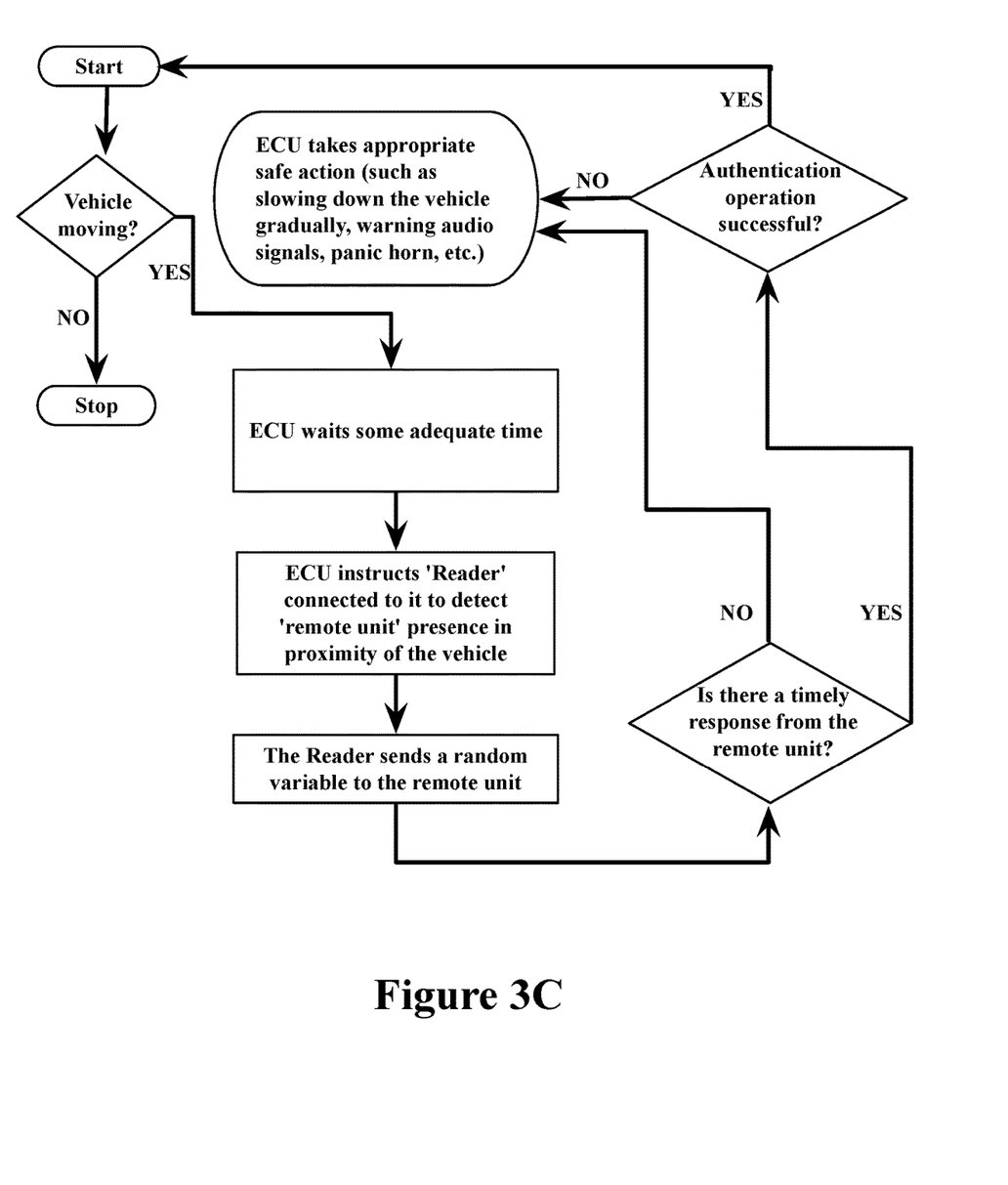
FIG. 3C, shows a flowchart showing how a remote unit associated with the operation of the vehicle could be detected when in proximity of the vehicle.

FIG. 3C is a flowchart of the situation wherein the current disclosure is used to prevent a vehicle to be stolen. Such a scenario occurs when the thieves use a radio amplifier to increase the intensity of signals from a remote unit, such as a key fob, located distant from a parked vehicle and thus fooling the vehicle to believe that the remote unit is in the proximity of the vehicle allowing the thieves to open the vehicle's door and drive it away. According to the current disclosure, once an ECU onboard the vehicle, connected to an authentication device of type 20, detects that the vehicle is moving, it waits some adequate time interval before trying to detect whether or not the remote unit is present in the proximity of the vehicle. It does so by the authentication device sending a random variable to the remote unit and expecting an encrypted packet of the Vehicle Identification Number (VIN) (data) from the remote unit within some reasonable time. If the remote unit responses back in an appropriate time window with the expected and correct encrypted packet of VIN, the ECU allows the vehicle to continue operating and repeats the above cycle again at appropriate intervals. However, if the ECU does not get the reply from the remote unit in an expected timeframe, or the result of authentication by the authentication device is wrong, the ECU takes an appropriate safe action (such as gradually slowing down the vehicle, broadcasting GPS location of the vehicle to the authorities, playing panic horn, etc.) to help preventing the vehicle to be stolen.

Figure 4A:
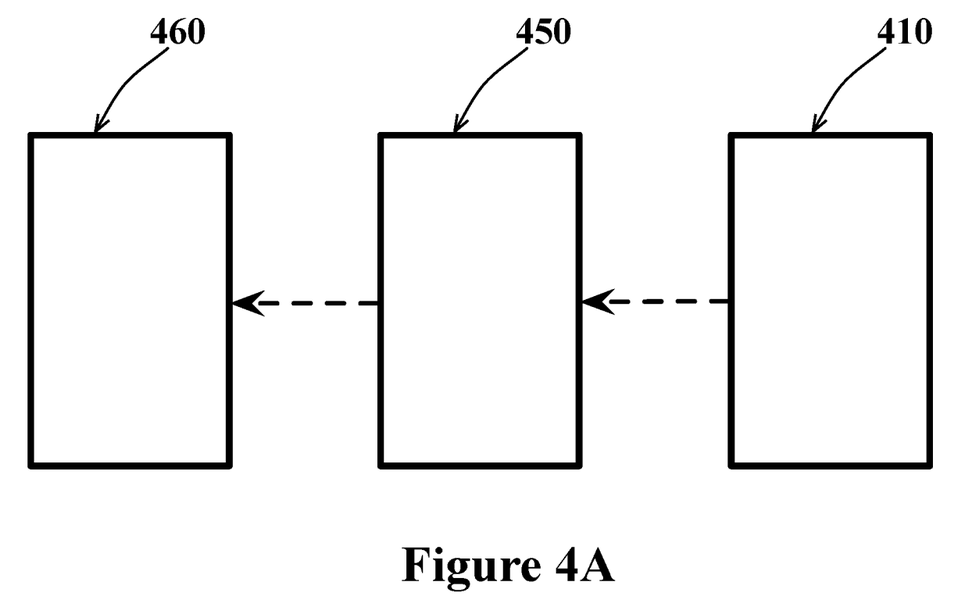
FIG. 4A shows a schematic diagram showing a remote unit communicating with the on-board remote control door lock (RCDL) module and the door lock.

Another operation used while using a vehicle, is unlocking the doors and starting the engine. Currently, these operations, shown in FIG. 4A, are performed by a remote unit 410 wirelessly connecting to a remote control door lock module (RCDL) 450 located onboard the vehicle which in turn is connected to a lock 460 (the lock 460 can be part of RCDL module). The remote unit can send a message wirelessly to the vehicle instructing the in-vehicle RCDL to unlock the door. Here the communication channel is a wireless type which can be easily attacked. In more details, the remote unit transmits a medium range wireless signal instructing the ECU to unlock the door. In this approach the intruder does not need to understand the structure and content of the message. Since the communication channel is medium range, its intensity decays with distance from the remote unit so that above certain distances the remote unit message fall below the noise level and is ineffective. However, it is possible to use a radio signal amplifier, for example, to repeat the message with increased intensity causing the door to be unlocked while the remote unit is out of sight or too far from the vehicle. This is because there are no provisions for RCDL to know if the message is originating from the remote unit or another external device. Once the door is unlocked the ignition button can be pressed to start the engine and the vehicle can be driven away.

Figure 4B:
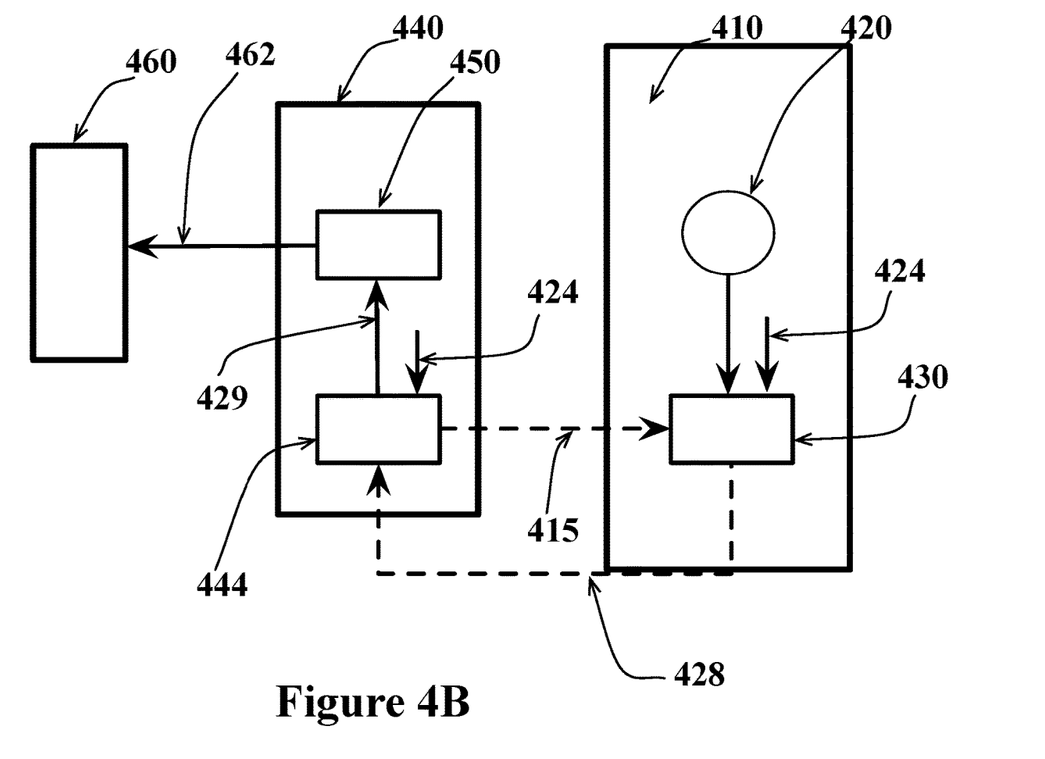
FIG. 4B shows a diagram of an embodiment wherein a vehicle can be securely unlocked or locked. The remote unit is equipped with an encrypting device which is used to prepare and send an encrypted packet to on-board RCDL module which uses its authenticating device to prepare a second encrypted packet and compare with the first packet to decide the authenticity of the remote unit request.

In some embodiments of the current invention, the remote unit message (data) is authenticated before the door is unlocked or the engine is turned on, preventing the vehicle from being stolen. FIG. 4B shows a remote unit 410, an extended remote control door lock module (RCDL) 440, and a lock 460. The remote unit is equipped with a button 420, an identification code 424 such as the commonly used Vehicle Identification Number (VIN) code, and a device 430 such as device 10 or 20 described in FIG. 1 or 2. The extended RCDL module 440 contains the standard RCDL 450 plus an additional authenticating device 444, wherein the device 444 is of type 20 as described in FIG. 2 above.

When the button 420 is pressed, the encrypting device 430 requests and receives a random code 415 from the device 444. The device 430 scrambles the identification code 424 (data) using the random code 415 and generates an encrypted packet 428 which it then transmits to the extended RCDL 440. The authenticating device 444 in turn prepares an encrypted packet of its own by first scrambling the pre-programmed identification code 424 using the random code 415 and then encrypting this scrambled data. Subsequently, device 444 compares its encrypted packet with the packet 428 it received from the device 430. If the two encrypted packets are identical, the device 444 deems the request from the remote unit authentic and communicates this decision to the RCDL 450. The RCDL, in turn sends the message 462 to the lock 460 causing it to unlock or lock the vehicle door.

In the embodiment of FIG. 4B, the communication channel 462 between the lock 460 and the RCDL 450 is a direct connection and is substantially immune to an attack. In some embodiments, this communication channel may be through the CAN, or any other, bus or it may be wireless and therefore not secure. If such a design is contemplated, the lock can be equipped with its own device 20 which will be used to verify that the command received from RCDL 450 is authentic before proceeding to unlock or lock the door.

The strength of the encryption and security mechanisms provided by the devices 430 and 444 prevents the encrypted packet 428 to be forged. This is because the compiled encryption key is buried deep into the layout of the devices 430 and 444 and cannot be deciphered. The packet is also unique, and any attempt to record the encrypted packet 428 and re-use it will be futile since every time the button 420 is pressed a new random code is generated. As a result, two successive pressing of button 420 leads to two different packets 428, each is usable to unlock/lock the door only once, and is meaningful only to the device 444.

In some embodiment of the invention it may be desired to gain authorized access to a vehicle when the remote unit is inaccessible. This may happen when the remote unit is residing far away from the vehicle location such as on the other side of the globe, or at a sufficient distance from the vehicle. In such cases the remote unit obviously will not be able to directly communicate with the ECU onboard the vehicle for its operation. The current embodiment takes advantage of the intermediary communication modules that are able to communicate across such long distances, these may include transceiver devices, radio transmitter/receivers, fax machines, etc. This implementation of the invention attempts to extend the range of communication between the remote unit and the vehicle by extending the range of communication lines 415 and 428 in FIG. 4B.

In some embodiments, the invention provides a means of performing an operation remotely. Here the operation of unlocking the door on a vehicle is described as an example. A person of skilled in the art recognizes that the same method applies to performing any other operation in the vehicle remotely.

Figure 5:
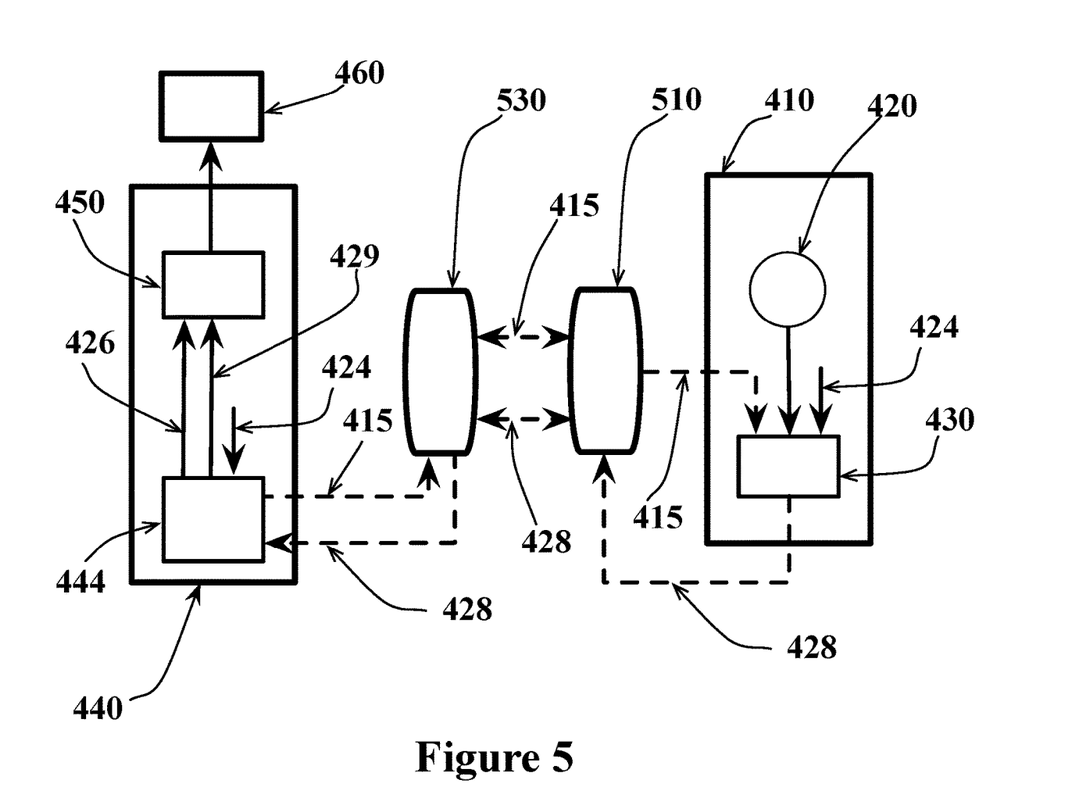
FIG. 5 shows a diagram of an embodiment wherein two transceivers located at distant locations enable remote operation of a vehicle. A remote unit is equipped with an encrypting device which is used to prepare and to send an encrypted packet to on-board RCDL module which uses its authenticating device to prepare a second encrypted packet and compares with the first packet to decide the authenticity of the remote unit request.

Consider the situation where the vehicle's owner for example, has carried the remote unit 410 on his trip to a location at a distance too far for the remote unit to be detectable by the circuitry in the vehicle. A second person, a borrower for example, is trying to operate the vehicle and does not have the remote unit. The communication between the owner and borrower is facilitated by their transceiver devices. FIG. 5 shows the extended critical module 440 in the vehicle, the borrower transceiver device 530, the owner transceiver device 510, and the remote unit 410. The transceiver devices 510 and 530 could be part of the critical modules 440 and the remote unit 410 respectively. The transceiver devices 510 and 530 run an application program designed to allow relevant information to be communicated between the two devices. Operationally, the transceiver device 530 through the application program requests the authenticating device 444 or standard RCDL 450 to initiate the operation of unlocking the vehicle. The above 444 or 450 devices in turn sends a random variable 415 to the transceiver device 530 which is subsequently sent to the transceiver device 510. The application program running on transceiver 510 in turn communicates the random variable 415 to the device 430. Since the identification code (data) 424 is already available in the remote unit 410, the device 430 prepares an encrypted packet 428 by encrypting the identification code 424 scrambled by the random variable 415 and sends the packet to the device 444 through the transceivers 510 and 530 using the application program running in these transceivers. The device 444 is already aware of the random variable it generated and the identification code 424 and thus is able to prepare its own package by encrypting the identification code 424 scrambled by the random variable 415. The device 444 then preforms a comparison of its encryption packet with the packet 428 already received from the remote unit. If the two packets are identical, the device 444 deems the request authentic 426 and using the output 429 informs RCDL 450 which then proceeds to activate the key 460 to unlock the door.

In some embodiments of the invention the result of the authentication process and other relevant information (such as GPS coordinates, temperature at the point of authentication, etc.) are recorded in a database. Data recorded in the database could be used at a later time for the purpose of diagnostics, analysis, hazards detection, real time tracking etc.

Some or all communications between any two devices, such as 340, 315 and 328 in FIG. 3A, or 342, 315, and 356 in FIG. 3B, or 415 and 428 in FIG. 4B could happen via wireless. Referring to FIG. 5, similarly, one or both communications 428, and 415 between the transceivers 510 and 530 and also between the transceivers and device 430, and 444 could also be wireless.

Although only certain examples have been described in detail above, those skilled in the art will readily appreciate that many modifications are possible in the examples without materially departing from this subject disclosure. Thus, by way of example, while it was described one way the ECU, sensor, actuator, and key fob were combined with authenticating devices, it will be appreciated that other components could be combined with other the authenticating devices. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for authenticating vehicle operation data in a vehicle comprising:
providing a first electronic circuitry in the vehicle,
further providing a remote unit capable of opening and operating the vehicle wherein the remote unit is equipped with a second electronic circuitry and both the first electronic circuitry and the second electronic circuitry include identical symmetric encryption engines and identical compiled encryption keys which are integral parts of their compiled synthesized logic,
sending a vehicle operation data from the remote unit to the first electronic circuitry,
receiving a random variable from the first electronic circuitry by the second electronic circuitry,
generating a first encrypted packet by encrypting the vehicle operation data using the second electronic circuitry and the random variable
further using the first electronic circuitry to generate a second encrypted packet using the random variable and comparing the first encrypted packet with the second encrypted packet, and
allowing the vehicle operation data to be used by the vehicle only if the first encrypted packet and the second encrypted packet are identical.

2. The method of claim 1, wherein the first electronic circuitry is installed adjacent to one of a sensor, an actuator, and an electronic control unit.

3. The method of claim 1, wherein the second electronic circuitry is installed adjacent to a group consisting of sensor, actuator, electronic control unit, and remote unit.

4. The method of claim 1, wherein the first electronic circuitry and the second electronic circuitry are capable of encrypting and decrypting.

5. The method of claim 1, wherein the vehicle is selected from a group consisting of an automobile, a truck, a train, an airplane, a drone, a satellite, a rocket, a bicycle, a motorcycle, a motorized one wheeler, a tram, and a robot.

6. The method of claim 1, wherein the comparing results are saved in a database.

7. The method of claim 1, wherein the random variable is generated by one of the first electronic circuitry, the second electronic circuitry, or is externally generated.

8. The method of claim 1, wherein the vehicle operation data is scrambled by the random variable before encryption and the scrambling is reversible.

9. The method of claim 1, wherein the first electronic circuitry detects the presence of the-remote unit by repeatedly authenticating the remote unit.

10. A method for authenticating vehicle operation data in a vehicle comprising:
providing a first electronic circuitry in the vehicle and a second electronic circuitry in a remote unit capable of opening and operating the vehicle wherein the first electronic circuitry and the second electronic circuitry are equipped with identical symmetric encryption engines and identical compiled encryption keys which are integral parts of their compiled synthesized logic, a unique identification code, and the vehicle is inaccessible to the remote unit,
further providing a first transceiver close to the vehicle and a second transceiver close to the remote unit,
using the first electronic circuitry to generate a random variable and transmit to the second electronic circuitry through the first and second transceivers,
utilizing the second electronic circuitry to encrypt the unique identification code using the random variable to generate a first encrypted packet and transmitting the first encrypted packet to the first electronic circuitry through the second and first transceivers,
generating a second encrypted packet by the first electronic circuitry using the unique identification code and the random variable,
comparing the second encrypted packet with the first encrypted packet, and utilizing the data for an operation of the vehicle only if the first encrypted packet and the second encrypted packet are identical.

11. The method of claim 10, wherein the vehicle is selected from the group consisting of an automobile, a truck, a train, an airplane, a drone, a satellite, a rocket, a bicycle, a motorcycle, a motorized one wheeler, a tram, and a robot.

12. The method of claim 10, wherein the transceivers run an application program for the operation of the vehicle and communication purposes.

13. The method of claim 10, wherein the comparing results are saved in a database.

14. The method of claim 10, wherein the first transceiver is a component of the vehicle and the second transceiver is a component of the remote unit.

15. The method of claim 10, wherein the remote unit is selected from the group consisting of a key fob, a remote control, a cellular phone, and a handheld device.

\* \* \* \* \*